US011309816B2

United States Patent
Brombach

(10) Patent No.: US 11,309,816 B2
(45) Date of Patent: Apr. 19, 2022

(54) WIND TURBINE WITH OVERLOAD-CAPABLE CONVERTER SYSTEM

(71) Applicant: Wobben Properties GmbH, Aurich (DE)

(72) Inventor: Johannes Brombach, Berlin (DE)

(73) Assignee: Wobben Properties GmbH, Aurich (DE)

(*) Notice: Subject to any disclaimer, the term of this patent is extended or adjusted under 35 U.S.C. 154(b) by 0 days.

(21) Appl. No.: 16/610,421

(22) PCT Filed: May 3, 2018

(86) PCT No.: PCT/EP2018/061339
§ 371 (c)(1),
(2) Date: Nov. 1, 2019

(87) PCT Pub. No.: WO2018/202772
PCT Pub. Date: Nov. 8, 2018

(65) Prior Publication Data
US 2020/0059178 A1 Feb. 20, 2020

(30) Foreign Application Priority Data
May 5, 2017 (DE) ...................... 10 2017 109 728.7

(51) Int. Cl.
*F03D 9/00* (2016.01)
*H02P 9/04* (2006.01)
(Continued)

(52) U.S. Cl.
CPC .............. *H02P 9/107* (2013.01); *F03D 9/257* (2017.02); *H02P 9/006* (2013.01); *H02P 2101/15* (2015.01)

(58) Field of Classification Search
CPC ...... H02P 9/006; H02P 9/107; H02P 2101/15; F03D 9/257
See application file for complete search history.

(56) References Cited

U.S. PATENT DOCUMENTS

| 5,345,375 A | 9/1994 | Mohan |
| 6,452,819 B1 | 9/2002 | Wobben |

(Continued)

FOREIGN PATENT DOCUMENTS

| CN | 100449904 C | 1/2009 |
| CN | 104578821 A | 4/2015 |

(Continued)

*Primary Examiner* — Tulsidas C Patel
*Assistant Examiner* — Thomas K Quigley
(74) *Attorney, Agent, or Firm* — Seed IP Law Group LLP

(57) ABSTRACT

A method and apparatus for operating a converter system of a wind turbine for exchanging electrical power with an electrical supply grid at a grid connection point are provided. In the method and apparatus, the converter system is operated in a normal operating mode. An overload situation affecting the converter system is detected and operation of the converter system is changed to an overload operating mode when the overload situation is detected. An average switching frequency for generating an output current is reduced in the overload operating mode of the converter system in comparison with the normal operating mode, a higher load is permitted on the converter system, which may be in the form of an increased temperature or an increased output current, in the overload operating mode of the converter system for a predetermined maximum overload period.

21 Claims, 5 Drawing Sheets

(51) Int. Cl.
*H02P 9/10* (2006.01)
*F03D 9/25* (2016.01)
*H02P 9/00* (2006.01)
*H02P 101/15* (2016.01)

(56) References Cited

U.S. PATENT DOCUMENTS

| | | | |
|---|---|---|---|
| 6,563,685 | B2 | 5/2003 | Gotzig |
| 7,787,266 | B2 * | 8/2010 | Janssen ............... H02M 5/4585 363/37 |
| 8,222,882 | B2 | 7/2012 | Balakrishnan et al. |
| 8,242,753 | B2 | 8/2012 | Engelhardt et al. |
| 8,487,461 | B2 | 7/2013 | Engelhardt et al. |
| 2013/0026841 | A1 | 1/2013 | Hosini et al. |
| 2015/0138852 | A1 * | 5/2015 | Siemaszko ............... H02M 1/32 363/50 |

FOREIGN PATENT DOCUMENTS

| | | |
|---|---|---|
| CN | 104737430 A | 6/2015 |
| CN | 105594113 A | 5/2016 |
| DE | 102006027465 A1 | 12/2007 |
| DE | 102008003299 A1 | 7/2009 |
| EP | 1107416 A1 | 6/2001 |
| EP | 2530816 A2 | 12/2012 |
| JP | H0549298 A | 2/1993 |
| JP | H066978 A | 1/1994 |
| JP | H07502160 A | 3/1995 |
| JP | 2002538752 A | 11/2002 |
| JP | 2007020262 A | 1/2007 |
| JP | 2010178617 A | 8/2010 |
| JP | 2012029438 A | 2/2012 |
| JP | 2015012657 A | 1/2015 |
| RU | 2653361 C1 | 5/2018 |
| WO | 2005027301 A1 | 3/2005 |
| WO | 2010079235 A2 | 7/2010 |

* cited by examiner

WIND TURBINE WITH OVERLOAD-CAPABLE CONVERTER SYSTEM

BACKGROUND

Technical Field

The present invention relates to a method for operating a converter system of a wind turbine. The present invention also relates to a wind turbine having a converter system. The present invention also relates to a wind farm.

Description of the Related Art

It has hitherto been conventional that a topology of an electrical supply grid is designed for the fact that large-scale producers such as coal-fired, gas or nuclear power plants feed large amounts of power into the electrical supply grid and likewise perform the majority of the grid stabilization. As a result of an increasing proportion of renewable energies, this grid topology can also change, with the result that renewable energies which usually act as decentralized producers undertake grid-supporting tasks to a greater extent.

In addition, grid operators establish rules of how decentralized producers are supposed to dynamically react to particular grid events such as grid faults or overloads/underloads.

In this case, the situation may also arise in which a decentralized producer such as a wind turbine must also briefly feed in an increased current, in particular in an overload situation such as in the case of a short circuit in the electrical supply grid.

Overload situations may likewise be produced by transient load connections in the electrical supply grid or by connecting transformers (transformer inrush) in the electrical supply grid which can likewise affect the decentralized energy producers.

As a result of such overload situations, there is then the risk of the decentralized producer, in particular the converter system thereof, which is used by the decentralized producer to feed power into the electrical supply grid, being jeopardized by an excessively high current or an excessively high power. Accordingly, the current to be fed in by such a converter system is usually limited.

In this case, however, it may be desirable for the decentralized energy producers to be able to be increasingly used to feed in power even when there is an overload situation in the electrical supply grid and for these energy producers not to be immediately limited for their own protection or for these energy producers not to have to be decoupled from the grid in an overload situation.

The disadvantage of converter systems is specifically that they are usually only prepared to be able to feed in a stipulated maximum power—provided with a safety margin, usually the nominal power, during continuous operation since otherwise there is the risk of overheating in components of the converter system if additional power is intended to be fed in with the converter system.

The German Patent and Trademark Office carried out a search in respect of the following prior art in the priority application for the present application: DE 10 2006 027 465 A1; DE 10 2008 003 299 A1; US 2013/0026841 A1; WO 2010/079235 A2 and CN 104 578 821 A.

BRIEF SUMMARY

Provided is a method which makes it possible to at least briefly increase a fed in current or power A method is provided for operating a converter system in a wind turbine in order to exchange electrical power with an electrical supply grid at a grid connection point. The wind turbine comprises the converter system for this purpose. The converter system may comprise, for example, one or more inverters which generate an electrical alternating current and feed it into the electrical supply grid. Situations may also occur in which, at least in the short term, the converter system takes power from the electrical supply grid, with the result that the exchange of electrical power with the electrical supply grid is generally referred to.

The inverter is therefore configured to be able to provide or output an inverter current, in particular a multiphase alternating current, at its inverter output. The electrical power generated from the wind in the form of the inverter current can therefore be fed into the electrical supply grid at the grid connection point which is also generally referred to as the PCC (Point of Common Coupling).

In a first step, the converter system is therefore operated in a normal operating mode. In this case, the inverter generates an electrical alternating current from the power generated by the generator or a part of said power in order to feed this alternating current into the electrical supply grid.

For this purpose, the electrical inverter preferably has a three-phase design and has at least one upper switch and one lower switch for each of the three phases for the purpose of generating the electrical inverter current. The switches of the inverter may be controlled in this case, for example, using a tolerance band method or a pulse width modulation method in order to generate the inverter current and to provide it at the inverter output.

Furthermore, the converter system can be permanently operated in the normal operating mode without thermal overheating occurring in a component of the converter system. In this case, the normal operating mode can also be understood as nominal operation at a nominal operating point.

In the normal operating mode, it is assumed that there is no overload situation relevant to the converter system, either in the converter system or in the electrical supply grid.

In a further step, an overload situation affecting the converter system is then captured. The situation therefore changes. In this case, the converter system is first of all still in the normal operating mode and captures or monitors stipulated measurement or signal variables or inputs which are described in yet more detail later. For example, an overload situation can be identified or detected on the basis of stipulated limit values or other predetermined criteria which are generally continuously captured during operation of the converter system.

Since—as already described at the outset—overload situations may arise for various reasons, universal criteria from the point of view of the converter must therefore be stipulated in order to be able to detect overload situations, and/or it is possible to deliberately check for different criteria in order to be able to capture different overload situations. In this case, examples of an overload situation are a brief current increase on account of a transformer being connected (inrush effect), a severe voltage fluctuation in the grid as a result of a transient load connection and/or load disconnection. Furthermore, a grid operator can also request that the converter be changed over to the overload mode if an increased power is intended to be briefly provided, for example, by the converter system in the event of a fault such as a short circuit in the grid.

If an overload situation is now detected at any time during normal operation, the converter system changes over to the overload operating mode in a further step. In this overload operating mode, the converter system is therefore configured for operation under overload. In particular, overcurrents which should normally be avoided and are, for example, up to 10% or more above a nominal current of the inverter system are now allowed.

For the overload operating mode, it is proposed that an average switching frequency for generating an output current is reduced. A converter shapes a current or a voltage by means of switching actions of circuit breakers, where the switching actions have an average switching frequency. This average switching frequency is reduced for the overload operating mode.

Additionally or alternatively, it is proposed to allow a higher load on the converter system, in particular an increased temperature and/or an increased output current, in the overload operating mode of the converter system for a predetermined maximum overload period. It has been recognized that such an increased load can be tolerated and the affected components are not damaged if this increased load is allowed only for a short period. A value of up to 30 seconds, preferably up to 10 seconds and, in particular, up to 5 seconds is preferably suggested as the maximum overload period.

An overtemperature can therefore be allowed for a short period at a power transistor, in particular. In this case, the overtemperature describes a temperature at which degradation effects, that is to say aging effects, already occur or can occur in the transistor. An increased temperature limit is preferably predefined for allowing an increased temperature. An increased current upper limit for the output current is preferably predefined for limiting an increased output current. As a result, the converter is prepared to allow a larger output current at the converter output which is above a maximum output current during in the normal operating mode.

It has been recognized that severe grid-related overload situations occur relatively rarely. They often last for only a few 10 milliseconds (ms), but this time may also be longer in exceptional situations. In this case, the thermal preload, the thermal capacitance and the thermal resistance of the circuit breakers often decisively concomitantly determine the overload capability of the converter system. In addition, it has likewise been recognized that other live components in the converter system are thermally scarcely loaded in comparison with the circuit breakers during grid-supporting overload feeding.

In this case, the so-called switching losses are temporarily reduced in the overload operating mode in comparison with the normal operating mode by reducing the average switching frequency of the converter system. In this case, a proportional relationship between the switching losses and the switching frequency of the power semiconductors in the converter system is present overall according to the following relationship:

$$P_{sw} = f_{sw} \cdot (E_{on}(V_{ZK}, I_{out}, T_j) + E_{off}(V_{ZK}, I_{out}, T_j)) \quad \text{Equation (1)}$$

with
$V_{ZK}$=Input voltage
$P_{SW}$=Switching losses $E_{on}$=Switch-on losses (intermediate circuit voltage)
$f_{sw}$=Switching frequency $E_{off}$=Switch-off losses $I_{out}$=Output current
$T_j$=Junction temperature As can be seen from Equation (1), the frequency, the voltage and the output current are decisive for the total switching losses. If $V_{ZK}$ and $I_{out}$ are kept constant and the switching frequency is reduced, the switching losses also accordingly fall. Conversely, however, the reduced switching frequency also increases the so-called on-state losses, but the latter do not increase as greatly as the switching losses fall if the frequency is reduced. Accordingly, the power transistors are heated to a lesser extent with a reduced switching frequency if $V_{ZK}$ and $I_{out}$ are kept constant. An additional increased power or an increased output current can therefore be fed in by suitably selecting the switching frequency since the power transistors on average are switched less often and are therefore heated more slowly.

It has been recognized that, in an overload situation in which a higher current must be briefly made available to the electrical supply grid, a sinusoidal current which has greater distortion can be fed in because it is in fact important to feed in a particularly large amount of power in the situation. It may then be sufficient to feed in a current which is greatly affected by harmonics in this grid fault.

The method according to the invention therefore makes it possible for the converter system to briefly feed in an overpower in an overload situation.

As a result of the use of the lower switching frequency, fewer switching losses are produced and, as a result, the converter can be operated in an overload situation for longer. Accordingly, the present converter system can be operated in an overload situation for longer than conventional converter systems and, as a result, can possibly briefly make an increased power available to the electrical supply grid.

The average switching frequency is preferably reduced in the electrical converter system for a stipulated and maximum overload period. In order to avoid the converter system being operated permanently in the overload operating mode in comparison with the normal operating mode, it is proposed to stipulate a maximum overload period, which is synonymous with the predetermined maximum overload period already mentioned.

The maximum overload period may be stipulated on the basis of the thermal properties and also or alternatively on the basis of the thermal preload of the converter system. The practice of taking components of the converter system as a basis for this also comes into consideration, in particular the semiconductor switches used to shape the current or the voltage.

The thermal properties relate, in particular, to thermal material properties, for example, the maximum thermal capacity or the maximum operating temperature of the relevant component. This may be, for example, the maximum junction temperature $T_j$ of the power transistor. The thermal conductivity and a thermal resistance also come into consideration. In this case, the thermal properties determine how long the converter system can be operated in the overload operating mode.

In addition, the current applied to the converter system is also decisive for the maximum overload period. In order to determine a maximum permitted overload, an $i^2$-t value which can synonymously also be referred to as a limit load integral can be considered. It predefines a limit for the load and this limit is composed of the overcurrent i and the period t for which this overcurrent occurs. The limit predefined in this manner is complied with if the square of the overcurrent i, integrated over the period, does not exceed the predefined value. If the overcurrent doubles, for example, it can be allowed only for a quarter of the period. The maximum period can likewise also be calculated from a known or expected overcurrent. If a maximum period for which an overcurrent can occur is known, the maximum current level can be calculated.

In the overload operating mode in particular, relative temperature limits, at which degradation effects in the components, for example, power transistors, are already accepted, are intentionally exceeded. In this respect, it was recognized that overload situations occur only relatively rarely and the degradation phenomena therefore have only a slight effect on the maximum service life of the components of the converter system.

In addition to the thermal properties, it is also proposed to additionally or alternatively take into account the thermal preload of the converter system when stipulating the maximum overload period. A thermal preload of the converter system may be the instantaneous temperature at the time at which an overload situation occurs. Consequently, a converter system with a lower temperature at the time at which an overload situation was captured can be operated in the overload operating mode for longer than a warmer converter system with a higher temperature. This is because it was recognized that a cooler converter system can still absorb more heat in the form of energy, in its thermal capacity, than if it already has a high temperature, that is to say has already stored a lot of heat.

According to one performance function, the converter system therefore takes into account the thermal properties and the thermal preload of components in the converter system and therefore makes it possible to be able to use the thermal capacities in an overload situation as effectively as possible and to the maximum possible extent.

Therefore, a converter system having a temperature-controlled or temperature-dependent average switching frequency is proposed.

However, components of the converter system may also be all components in the converter system which can heat up and can overheat. These include components such as inductors, switches, power supply units, heat sinks, coils and rectifiers, to name just a few examples.

An overload situation is preferably captured by means of a current measurement, a temperature measurement or a voltage measurement. A combination of the measuring methods is likewise provided as a variant in this case.

In this case, the current measurement is preferably carried out at the output of the converter system, in particular if this measured value is captured anyway for controlling the converter system, and an additional current measurement device can therefore be dispensed with.

The temperature measurement is preferably carried out at a heat sink or directly at a live component of the converter, for example, directly at a power transistor. A heat sink is particularly readily accessible for measurement, whereas a measurement at a live component enables a measurement directly where overheating can also occur.

An overload situation can likewise be determined by means of a voltage measurement which can be preferably carried out in an intermediate circuit of the converter system or directly in the electrical supply grid. In this case, a DC voltage measurement is consequently carried out in the case of a voltage measurement in an intermediate circuit of the converter system, in which case a voltage amplitude there, in particular, allows a conclusion to be drawn with respect to an overload situation. In contrast, in the case of a voltage measurement in the electrical supply grid or in the electrical farm grid, the frequency of the grid voltage can also be measured in addition to the amplitude of the grid voltage.

In this case, a plurality of measurement and operating parameters are preferably respectively captured since an overload situation can affect a converter system in different ways.

If a temperature measurement is carried out for the purpose of capturing an overload situation, the thermal state of the converter system can generally also be assessed using the captured temperature.

One embodiment proposes that a changeover between the normal operating mode and the overload operating mode is made on the basis of at least one criterion from the list comprising:

exceeding of a stipulated limit temperature value at a live component of the converter system;

exceeding of a stipulated limit current at the output of the converter system;

exceeding of a stipulated limit voltage in the converter system;

exceeding of a stipulated voltage range in the electrical supply grid if the converter system is operated within the voltage range in the normal operating mode;

exceeding of a stipulated frequency range of the voltage in the electrical supply grid if the converter system is operated within the frequency range in the normal operating mode;

a request to output a higher power which is predefined by means of an external signal.

According to the proposed embodiment, the exceeding of a stipulated limit temperature at a live component of the converter relates, in particular, to a temperature measurement at a component of the converter system. This temperature measurement is carried out, for example, using a suitable temperature sensor such as a PT100, and a measurement is carried out, in particular, at the components which heat up particularly quickly in an overload situation. A suitable temperature measuring point would therefore be on a heat sink of a power transistor, for example.

The exceeding of a stipulated limit current at the output of the converter system preferably relates to the above-mentioned current measurement which can be carried out at the output of the converter system.

It has been recognized that a current measurement at the output of the converter system is particularly advantageous since this measured value is required anyway in many modern converter systems for the existing control of the power transistors.

A further criterion for capturing an overload situation is to operate the converter system within a defined voltage range in the normal operating mode and to stipulate an upper voltage limit and a lower voltage limit. If the instantaneous measured voltage leaves this stipulated voltage range, the converter system interprets this as an overload situation and changes over to the overload operating mode. In this case, the voltage ranges can be stipulated both for the intermediate circuit of the converter system and for an amplitude measurement of the grid voltage.

In addition to the stipulated voltage range, another possible criterion is a stipulated frequency range of the voltage in the electrical supply grid, wherein an overload situation is also detected here if the instantaneous measured frequency value of the grid voltage leaves the stipulated frequency range, wherein the converter is operated again within this frequency range in the normal operating mode. Such a frequency measurement can also anticipate an overload situation if it captures a frequency behavior which triggers a behavior of the converter which in turn results in an overload situation.

Another criterion for detecting an overload situation may be a request to output a higher power. For example, this request can be transmitted to the converter system by means of an external signal. In this case, an overload situation need not necessarily be determined by metrology in the converter system, but rather the situation may also occur in which a grid operator requests that an increased power output be provided on account of a grid fault even though the inverter is already being operated at an upper limit of normal operating mode and therefore already outputs the maximum power output during continuous operation. Quite generally, the external signal can be predefined by any desired controller structure or manually from an operation center if, for example, an overload situation is expected but has not yet occurred.

Thermal reserves, for example, in the form of higher temperature limits, can therefore be enabled even though an overload situation has not yet occurred under certain circumstances.

According to another embodiment, a current limitation is preferably carried out if a maximum overload period or a predefined $i^2t$ value or a predefined maximum value for a limit load integral is reached.

It is therefore proposed that the overload operating mode is not intended to be permanently present since otherwise thermal damage and severe degradation phenomena can occur. In order to combat this thermal overloading, it is therefore proposed to carry out a current limitation of the converter system if a maximum overload period is reached, wherein the current limitation is stipulated, in particular, in such a manner that the live components of the converter system which have heated up no longer heat up any further or even cool down again.

Accordingly, the converter system has a current limitation which is switched on only if a particular absolutely stipulated temperature limit value, which is above a relative temperature limit value in the normal operating mode, is reached. The converter system can therefore advantageously exhaust the thermal capacities of the components as far as possible, but prevent complete overheating.

Another embodiment of the method proposes the practice of changing back into the normal operating mode again if the overload situation is no longer captured or detected.

The converter system therefore makes it possible to automatically switch back to the normal operating mode and continuous operation. As a result, a state in which current which has greater distortion is fed in is kept as short as possible in terms of time, in particular.

One embodiment also proposes that the maximum overload period, which can also be referred to as an overload operating period, that is to say the time in which the converter system is allowed to be in an overload operating mode, is determined on the basis of the thermal preload of the converter system. In this case, the operating temperature which is present in a component of the converter system at the time of the captured overload situation can be used as the thermal preload. In a second variant, the maximum overload period can likewise be determined on the basis of a percentage output current value with respect to a nominal output current of the converter system. Therefore, a converter system which was operated at 25% of the nominal power during continuous operation for example, can be operated in an overload operating mode for longer than a converter system which was previously operated at 90% of the output current nominal value, for example.

The converter system can therefore determine the thermal preload not only on the basis of a temperature measurement but also on the basis of the knowledge of the current nominal value which has been previously fed in. The maximum overload period can be determined on the basis thereof.

The converter system is preferably operated with an increased power output at a reduced switching frequency in the overload operating mode in order to enable a briefly increased power output in an overload situation.

It is therefore proposed, in particular, to deliberately feed an increased power into the electrical supply grid. In particular, this increased power can be above the nominal power of the converter system. This is enabled at least in the short term by using a lower switching frequency.

Since severe overloads in the electrical grid or requests for higher power from the grid occur very rarely and are often not present for no longer than 10 ms, a high instantaneous reserve, for example, can also be provided by the overload operation described. In this case, the converter system is preferably prepared to change over to the overload operating mode at any time independently or on the request of a grid operator.

In addition to the severe overloads which occur relatively rarely and usually do not occur for longer than 10 ms, there may also be overloads, in the case of which less power must be directly provided. Overloads which last for a longer time may be present in this case for approximately 10 ms to 30 s. One variant therefore proposes allowing overloads for a period in the range of 10 ms to 30 s. Therefore, the proposed method primarily describes instantaneous reserve control in order to be able to react to grit faults and overload situations.

One embodiment therefore proposes the practice of leaving the power output unchanged but nevertheless reducing the switching frequency. This makes it possible to relieve the load on the converter. This may also address a situation in which the output current rises even though the power output does not rise. Such a current rise can occur as a result of an inrush current, for example.

As a result, it is possible to pass through an overload at a reduced switching frequency in order to protect the converter system from overload coupling and possibly overheating.

Therefore, the converter system is operated in such a manner that switching losses in the converter system are reduced as a result of the reduced switching frequency and a less ideal sinusoidal output current than in the normal operating mode is generated by the converter system in order to reduce switching losses and to protect the converter system from overheating.

The converter system preferably has a first parameter set and a second parameter set which comprise the limit temperatures of the components of the converter system during normal operation and in the overload operating mode. In this case, the maximum limit temperatures in the overload operating mode are above relative temperature limits of the normal operating mode. In addition to the temperature limits mentioned, other operating parameters which are predefined to the converter system in the overload operating mode, such as the average desired switching frequency value to be set and/or the desired power output value, can also be stored in the parameter set. These are generally adapted desired values for a control method, such as an increased desired current value in the case of overload feeding or desired values adapted in another manner for the converter system, such as a changed desired switching frequency value. As another specific example, desired values specifically adapted to the overload operating mode for a tolerance band method or a pulse width modulation method can also be stored in the parameter set of the overload operating mode.

In this case, it is proposed that the maximum limit temperatures in the overload operating mode are greater than the maximum limit temperatures in the normal operating mode, the average desired switching frequency value in the overload operating mode is less than the average desired switching frequency value in the normal operating mode, and the first desired power output value is greater than or equal to the second desired power output value, and wherein a changeover from the first parameter set to the second parameter set is made when changing the converter system into the overload operating mode in order to be able to briefly operate the converter system with the greater maximum limit temperatures.

Uncontrolled transition behaviors are also avoided, in particular, as a result of the proposed changing over from the first parameter set to the second parameter set that operation in the overload mode is implemented in a simple manner.

In this case, the temperature limits during normal operation may be relative temperature limits which can be exceeded for a short time, but can already result in degradation phenomena in the components of the converter system. In contrast, the temperature limits in the overload operating mode should be understood as meaning, in particular, absolute limits which must not be exceeded in any component of the converter system since otherwise local thermal damage can be produced in the converter system. It is pointed out as a precaution that, when determining the temperature limits in the overload operating mode in an expert manner, there is a safety margin with respect to a temperature limit at which a component of the converter system would be thermally destroyed.

As a result of the proposed method, the inverter can be briefly operated in the overload operating mode above a relative temperature limit based on normal operation, in which case this operating mode should be present only briefly. In comparison with conventional converter systems, the proposed converter system or the converter system with the proposed method therefore has a larger usable operating range and briefly enables a power output above 100% of the output power based on the maximum output power during continuous operation of nominal operation.

The time in which the converter system is in the overload operating mode is preferably recorded. In order to be able to create a thermal overload history for the converter system, it is proposed, as a preferred variant, to integrate an overtemperature value over time to form an overload integral. In this case, the overtemperature describes a temperature value of any desired component of the converter system which exceeds a limit temperature. This means that the temperature value, for example, is integrated over time as soon as the relative temperature limit of the normal operating mode is exceeded. In this case, the integration is carried out until the temperature of the converter system falls below the relative limit temperature of the normal operating mode again. The temperature value above the relative limit value in the normal operating mode is therefore also referred to as an overtemperature value.

It is therefore possible to create a thermal overload history for the converter system, and this history makes it possible to estimate the frequency of the occurrence of an overload. In the case of a very large overload integral value, it is possible to draw a conclusion with respect to overload-related aging phenomena (degradation) of the components of the converter system.

The converter system is preferably operated during overload operation with a frequency or switching frequency which is reduced by 50%, preferably by 75%, in particular by 90%, in comparison with the normal operating mode. A significant reduction in the switching frequency is therefore proposed in order to thereby significantly reduce the switching losses during overload operation, with the result that at least a higher current can be accordingly fed in with the same heat development.

The current and voltage measurement in the converter system or in the electrical supply grid preferably also comprises a frequency and amplitude measurement of the measured current and of the measured voltage. It is therefore possible to capture the corresponding measurement variables for embodiments described above.

The converter system is therefore configured to perform an overload situation on the basis of a frequency or amplitude measurement of the measured current or of the voltage since overload situations or grid events can be detected or anticipated on the basis of a frequency or amplitude change. The frequency and amplitude measurement likewise includes being able to measure the change rates of the frequency and the amplitude of the current and the voltage in order to be able to predict a strong decrease in an occurring overload situation on the basis of the derivative or the gradient.

Provided is a wind turbine for exchanging electrical power with an electrical supply grid at a grid connection point.

Accordingly, the wind turbine comprises a converter system for generating an electrical current and/or an electrical voltage, wherein the converter system in this case may also have a plurality of converters or a plurality of converter cabinets. If the output power of a single converter does not suffice to feed in the power generated by the generator of the wind turbine, a plurality of converters or switchgear cabinets may also be connected in parallel with a converter.

A control device (e.g., controller) for controlling the converter system is proposed as a further component of the wind turbine. In this case, the control device may be provided as a process computer or may be implemented on such a process computer. It is therefore proposed to implement the control device as hardware or as part of a computer program. In particular, the control unit is prepared to operate the converter system in an overload situation with a switching frequency which is reduced in comparison with normal operation. For this purpose, the control device can change a clock frequency or a tolerance bandwidth, for example.

In addition to the control device, one or more measuring device for capturing an overload situation affecting the converter system are also provided. In this case, a measuring device can capture different measurement variables depending on the place of use. For example, a first measuring device (e.g., ammeter) can carry out a current measurement at the output of the converter system and a second measuring device (e.g., temperature sensor) can be used to carry out a temperature measurement at a live component of the converter system. A voltage measurement (e.g., by a voltmeter) in the intermediate circuit of the converter system or in the electrical supply grid can likewise be implemented. Very generally, the measuring devices are used to capture measurement data or measured values, on the basis of which an overload situation is derived or detected. A plurality of measuring devices may also be used at the same time to capture measurement data or measured values so that an overload situation can also be redundantly captured, if necessary, if a measuring device fails, for example, or if a plurality of the criteria which were described at the outset and indicate a prevailing overload situation are satisfied.

In addition to the control device, the changeover device, which can change over between the normal operating mode and the overload operating mode, may also be provided on a process computer or may be implemented as part of a computer program. The changeover device may also be part of the control device.

Therefore, one embodiment proposes that the wind turbine, in particular the control device, is configured to perform a method according to one of the embodiments described above.

The converter system preferably has temperature-resistant power transistors, wherein the power transistors consist, in particular, of modern semiconductor materials such as SiC, GaN or SiGE. In particular, modern power transistors based on silicon carbide provide positive electrical properties with respect to the switching speed, the thermal conductivity and the critical field strength in comparison with conventional power transistors based on silicon.

A converter system is therefore proposed, which converter system uses modern power transistors which are distinguished by better temperature resistance and therefore likewise constructively increase the ability of the converter system to be overload-capable.

According to another embodiment, the wind turbine has a first parameter set and a second parameter set. In this case, the two parameter sets comprise operating parameters for operating the wind turbine in the normal operating mode and in the overload operating mode, for example, the maximum limit temperatures of the components of the converter system, the average switching frequency to be set for the respective operating mode and/or the desired power output value. In this case, the parameter sets may be stored in the control device of the wind turbine, that is to say—as described above—in a process computer or as part of a computer program. The changeover device can therefore change over between the stored parameter sets and therefore configures the wind turbine or the converter system for operation in the normal operating mode or in the overload operating mode.

Provided is a wind farm having a plurality of wind turbines, which wind farm, according to another embodiment, has at least one wind turbine according to an embodiment described above. The wind farm preferably has only wind turbines of this type.

The wind farm therefore likewise enables a normal operating mode and an overload operating mode, wherein an additional total power of all wind turbines can be temporarily fed into the electrical supply grid in an overload situation. In this respect, it is pointed out that the overload capability of the individual wind turbines may be different in a wind farm having different types of wind turbines. In this case, each wind turbine can provide only as much additional power in an overload situation as permitted by its converter system or as stipulated by the overload operating period described above.

If no additional power is requested in an overload situation, the wind farm can therefore also pass through the overload situation.

BRIEF DESCRIPTION OF THE SEVERAL VIEWS OF THE DRAWINGS

The present invention is now explained in more detail below, by way of example, on the basis of exemplary embodiments with reference to the accompanying figures.

DETAILED DESCRIPTION

Figure 1:
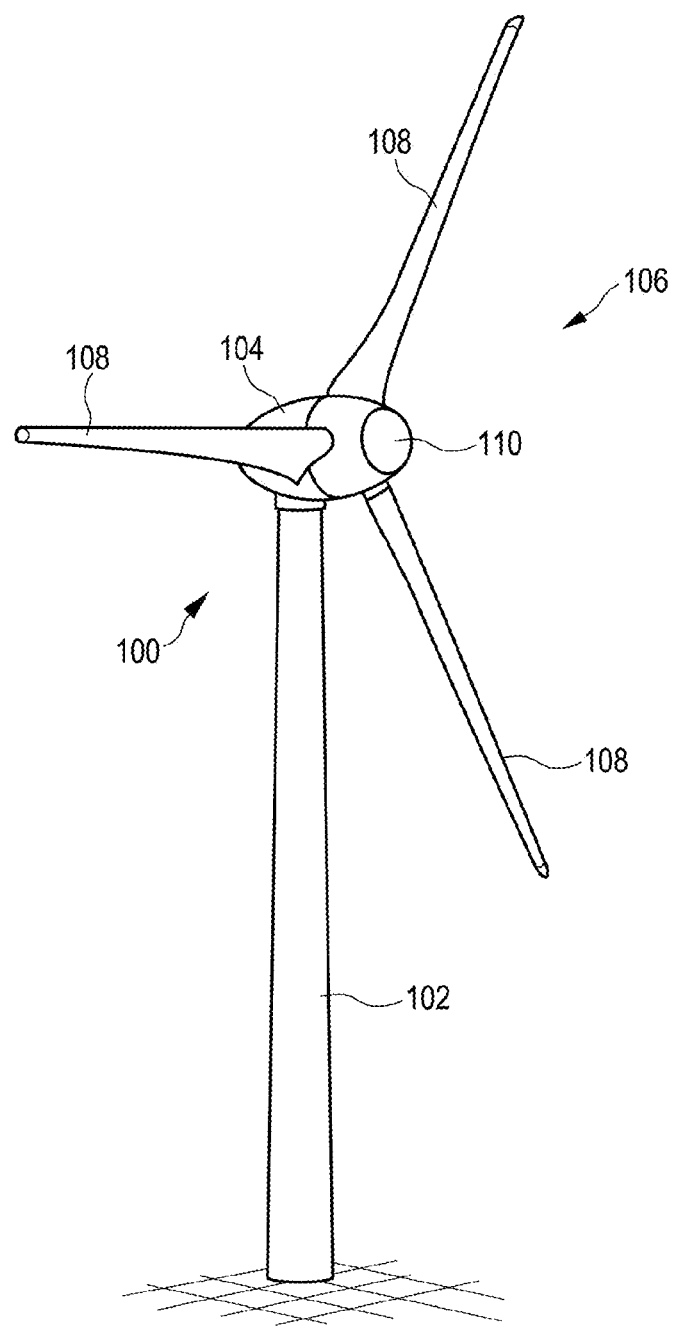
FIG. 1 shows a schematic view of a wind turbine.

FIG. 1 shows a wind turbine 100 having a tower 102 and a nacelle 104. A rotor 106 having three rotor blades 108 and a spinner 110 is arranged on the nacelle 104. The rotor 106 is caused to rotate by the wind during operation and thereby drives a generator in the nacelle 104.

Figure 2:
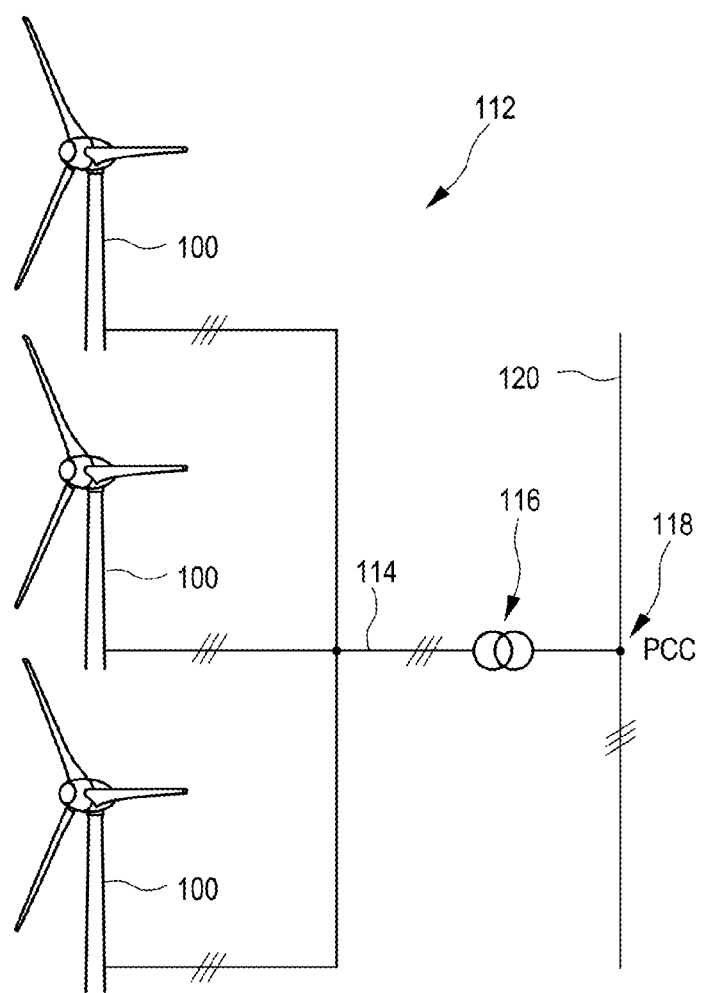
FIG. 2 shows a schematic view of a wind farm.

FIG. 2 shows a wind farm 112 having three wind turbines 100, by way of example, which may be identical or different. The three wind turbines 100 are therefore representative of fundamentally any desired number of wind turbines in a wind farm 112. The wind turbines 100 provide their power, namely the generated current in particular, via an electrical farm grid 114. In this case, the respectively generated currents or powers from the individual wind turbines 100 are added and a transformer 116 is usually provided, which transformer steps up the voltage in the farm in order to then feed it into the supply grid 120 at the feed-in point 118 which is also generally referred to as the PCC. FIG. 2 is only a simplified illustration of a wind farm 112 which does not show any control, for example, even though control is naturally present. The farm grid 114 may also be different, for example, by virtue of a transformer also being present at the output of each wind turbine 100, for example, to name just one other exemplary embodiment.

Figure 3:
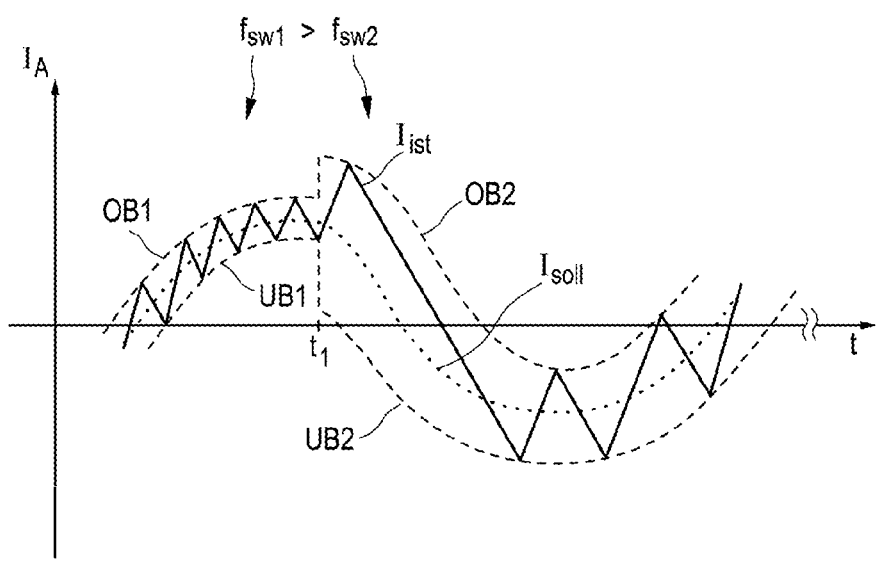
FIG. 3 schematically shows a first control-based changeover to an overload operating mode from a normal operating mode according to one embodiment if an overload situation has been captured.

FIG. 3 schematically shows a tolerance band method which can be used, for example, as a preferred control method in the converter system, in order to be able to control the power transistors in the converter system and to generate a stipulated output current. In this case, the output current $I_A$ generated by the converter system is plotted against the time t in FIG. 3, wherein only a sine wave of a phase current of one phase is illustrated for the sake of a better illustration. Very generally, the tolerance band method is based on the principle that an upper limit (OB) and a lower limit (UB), which run around an optimum sine, are stipulated for the output current $I_A$ of the converter system, wherein the optimum sine is predefined as the desired value $I_{soll}$. The output current $I_{IST}$ usually measured at the output of the converter system runs only within the stipulated tolerance limits, which is also referred to as the tolerance band. If the measured output current $I_{IST}$ reaches either the upper limit or the lower limit of the tolerance band in this case, a changeover operation of the power transistors of the converter is carried out or a commutation operation to another current path is carried out by means of a changed switch position in the inverter.

In the exemplary embodiment shown in FIG. 3, the upper limit OB1 and the lower limit UB1 are closer to the sinusoidal desired current value $I_{soll}$ than the upper limit OB2 and lower limit UB2. At the times at which the measured actual current $I_{ist}$ reaches a tolerance band limit, commutation or changing over to another switch position in the converter system takes place, as a result of which the actual current assumes a zig-zag-shaped profile within the tolerance band. In order to compare OB1 and UB1, the limits OB2 and UB2 are at a greater distance from the desired current value $I_{soll}$. The result of this is that the power transistors in the converter system must switch more frequently in the first time period to the time $t_1$ than is the case in the second time period after $t_1$. Therefore, the switching frequency of the power transistors is on average lower in the time period after $t_1$. For example, the normal operating mode is present until the time $t_1$, that is to say none of the criteria which indicate an overload situation is satisfied or is detected by the converter system. At the time $t_1$, at least one of the criteria described above is now satisfied by way of example, with the result that a changeover to the overload operating mode is carried out by the converter system, in each case a new upper limit OB2 and a new lower limit UB2 are predefined in the tolerance band method. These limits may be stored, for example, in the parameter set of the overload operating mode. As a result of the widening of the tolerance band, the average switching frequency therefore falls, as a result of which the switching losses in the converter system are reduced overall. Therefore, the average switching frequency $f_{sw1}$ in the normal operating mode is greater than the frequency $f_{sw2}$ in the overload operating mode and the power output from the converter system is approximately constant.

In addition to the tolerance band method, however, other control methods may also be provided, for example, a so-called pulse width modulation method. This control method is generally known to a person skilled in the art.

In a pulse width modulation method, in order to generate a lower average frequency, the rise of a linearly rising or falling sawtooth or triangular signal is quite generally reduced. In this case, the sawtooth or triangular signal is processed together with a carrier signal in order to generate a PWM signal for controlling the power transistors. Therefore, the average switching frequency falls in such a pulse width modulation method if the frequency or the rise of the sawtooth or triangular signal is reduced.

Figure 4:
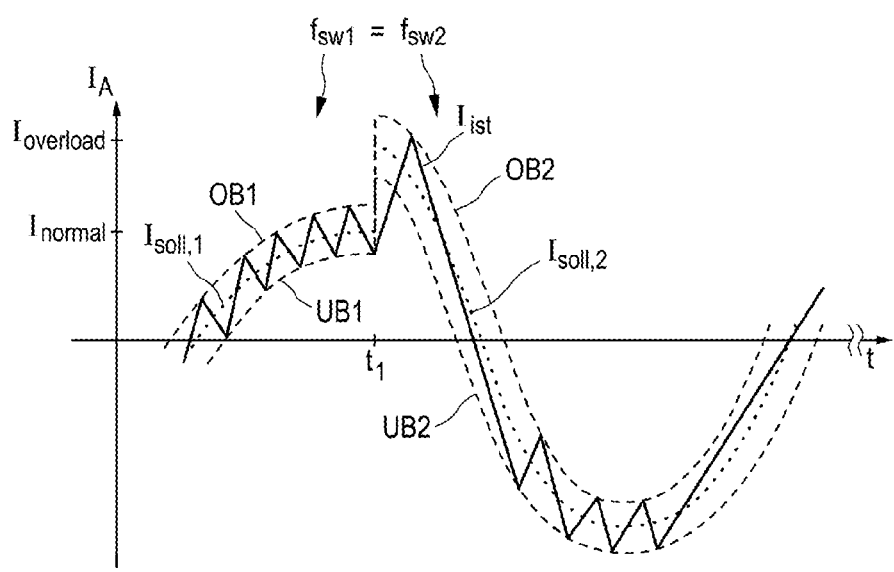
FIG. 4 schematically shows a second control-based changeover to an overload operating mode from a normal operating mode according to one embodiment if an overload situation has been captured.

The further exemplary embodiment shown in FIG. 4 shows how a higher load on the converter system can be allowed. In this case, it is possible to set an increased output current or an increased power output in the converter system in the overload mode without changing the average switching frequency. For this purpose, the two tolerance band limits OB2 and UB2 are increased and a new desired output current value $I_{soll,2}$ in the overload operating mode is predefined. The new values for OB2, UB2 and $I_{soll,2}$ can be included in the parameter set for the overload operating mode. In this case, the distance of the tolerance band limits OB1 to UB1 and OB2 to UB2 remains unchanged in the overload operating mode, with the result that the average switching frequency $f_{sw1}$ in the normal operating mode corresponds to the average switching frequency $f_{sw2}$ in the overload operating mode.

The converter system therefore generates a higher output current $I_{overload}$ in the overload operating mode. However, this current is allowed only for a predetermined maximum overload period. Additionally or alternatively, higher temperature limits are also allowed for the converter system in the overload operating mode for a short time period. This is not illustrated in FIG. 4.

Therefore, the converter system can be operated in the overload operating mode if a higher power requirement is expected or if an external signal requests this. An increased desired power output value can therefore be briefly predefined or set. If an increased power is not required, it is also possible to allow at least one increased temperature limit in the overload operating mode without reducing the average switching frequency. It has been recognized that such an excessive power increase can be allowed if it is brief.

Figure 5A:
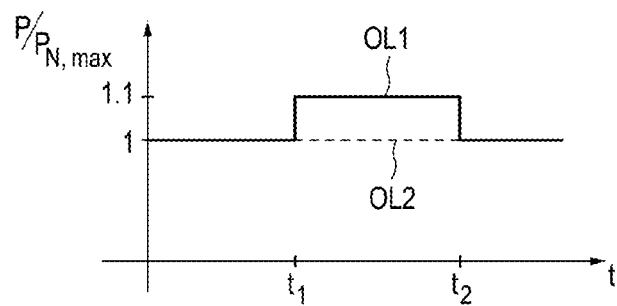
FIGS. 5A-5C schematically show the profile of the power output, the switching frequency and the temperature development in the converter system during a temporary overload situation.
Figure 5B:
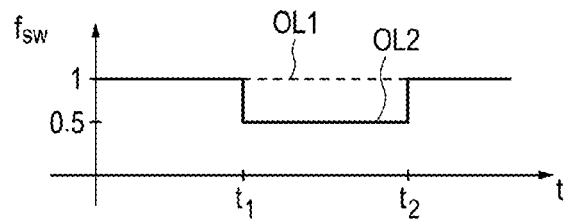
Figure 5C:
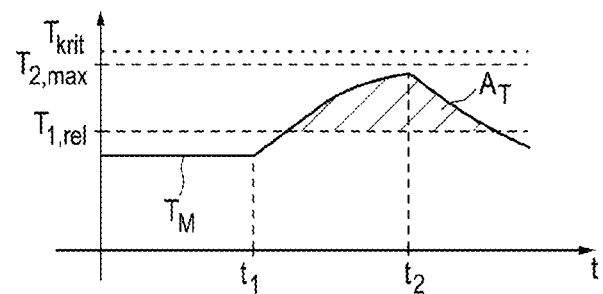

FIGS. 5A-5C illustrate the behavior of the converter system when an overload situation occurs at the time $t_1$. In this case, FIG. 5A illustrates the power output behavior of the converter system in an overload situation based on a maximum nominal power $P_{N,max}$ which can be fed in by the converter system during continuous operation.

If an overload situation is detected at the time $t_1$, a higher nominal power P can be fed into the electrical supply grid according to the proposed solution by reducing the frequency by 50% and by feeding at less ideal sinusoidal current into the supply grid. In this case, a frequency reduction of the average switching frequency $f_{sw}$ at the time $t_1$ is illustrated in FIG. 5B in the curve section OL2. Additionally or alternatively, the average switching frequency $f_{sw}$ can be kept constant, which is shown by the curve section OL1 in FIG. 5B, and an increased power can nevertheless be fed in, which is illustrated by the curve section OL1 in FIG. 5A. In this respect, the curve section OL2 in FIG. 5A illustrates only the unchanged profile of the power P as orientation.

The possibility of using the reduced switching frequency on account of the lower switching losses in order to be able to briefly output an increased power is indicated by OL1 in FIG. 5A. In the exemplary embodiment shown, an increased root mean square value of the output current, for example, is generated by the converter system during overload operation in comparison with the normal operating mode. However, this results in the converter system or the live components of the converter system being thermally heated. This is illustrated in FIG. 5C.

For simplification, FIG. 5C illustrates an idealized temperature profile $T_M$. For example, it is assumed that, in the time period up to $t_1$, the heating power output corresponds to the heating power generated in a component of the converter system and therefore there is a constant profile. In this case, the temperature $T_M$ is preferably determined at the component(s) at which overheating would form most quickly in an overload situation. If the output power is now increased at the time $t_1$ in an overload situation, more thermal energy is consequently generated, under the assumption mentioned, than can be output via the provided cooling sections or heat sinks. This results in a rise in the temperature of the components in the converter system after the overload situation occurs at the time $t_1$.

In FIG. 5C, three temperature limits are illustrated on the y axis, in which case the temperature limit $T_{1,rel}$ relates to the relative temperature limit in the normal operating mode, the temperature limit $T_{2,max}$ is the maximum temperature limit during overload operation and the temperature $T_{krit}$ corresponds to a critical and absolute maximum temperature at which the component of the converter system is thermally destroyed. If the measured temperature value $T_M$ now exceeds the temperature limit $T_{1,rel}$, as a result of the increased power feed, aging phenomena (degradation) may already occur at or in the components of the converter system. The converter system is therefore at a desired overtemperature in the temperature range from $T_{1,rel}$ to $T_{2,max}$.

Furthermore, FIG. 5C indicates a temperature-time area $A_T$ which can be recorded and stored as an overload history in a suitable storage medium in order to be able to draw conclusions on the frequency of overloads and create a thermal load profile of the components.

In a similar manner, a square of an output current $i_A^2$ can be integrated over time and the integral, that is to say the area below such an $i_A^2$ curve over time, must then remain below a limit value.

The invention claimed is:

1. A method for operating a converter system of a wind turbine to exchange electrical power with an electrical supply grid at a grid connection point, comprising:
operating the converter system in a normal operating mode;
detecting an overload situation in the electrical supply grid affecting the converter system;
changing operation of the converter system from the normal operating mode to an overload operating mode if the overload situation is detected; and
operating the converter system in the overload operating mode during the overload situation in the electrical supply grid,
wherein:
an average switching frequency for generating an output current is reduced in the overload operating mode of the converter system in comparison with the normal operating mode,
a higher load on the converter system is permitted in the overload operating mode for a maximum overload period,
during the overload operating mode, an overtemperature is permitted for the maximum overload period in the converter system, and wherein the overtemperature is a temperature at which degradation occurs in the converter system or at which the converter system is prone to the degradation, and
the average switching frequency is reduced for the maximum overload period, wherein the maximum overload period is determined based on a thermal preload of the converter system that is based on a thermal capacity of the converter system or a thermal preload of components of the converter system that is based on a thermal capacity of the components of the converter system.

2. The method as claimed in claim 1, comprising:
increasing the output current in the overload operating mode of the converter system for the maximum overload period; or
determining the maximum overload period based on a limit load integral, wherein the limit load integral is determined based on an overcurrent and duration of a period over which the overcurrent occurs.

3. The method as claimed in claim 1, comprising:
detecting the overload situation based on a current measurement made at an output of the converter system, a temperature measurement made at a heat sink or at a live component of the converter system or a voltage measurement made at an intermediate circuit of the converter system, the electrical supply grid or a farm grid.

4. The method as claimed in claim 1, comprising:
changing from the normal operating mode to the overload operating mode based on at least one criterion from a list including:
a live component of the converter system exceeding a limit temperature value;
an output of the converter system exceeding a limit current;
the converter system exceeding a limit voltage;
the electrical supply grid exceeding a voltage range when the converter system is operated within the voltage range in the normal operating mode;
a voltage of the electrical supply grid exceeding a frequency range for the voltage when the converter system is operated within the frequency range in the normal operating mode; and
receiving, by an external signal, a request to output a higher power.

5. The method as claimed in claim 1, wherein a current limit of the converter system is effected if the maximum overload period is reached.

6. The method as claimed in claim 1, comprising:
changing operation of the converter system from the overload operating mode to the normal operating mode when the overload situation is no longer detected.

7. The method as claimed in claim 1, comprising:
determining the maximum overload period based on the thermal preload of the converter system; and
determining the thermal preload based on an operating temperature of a component of the converter system at a time of detecting the overload situation or based on a percentage output current value with respect to a nominal output current of the converter system.

8. The method as claimed in claim 1, comprising:
operating the converter system with an increased power output at a reduced switching frequency in the overload operating mode to enable increasing the power output in the overload situation.

9. The method as claimed in claim 1, comprising:
operating the converter system with a constant power output in the overload operating mode to reduce switching losses in the converter system.

10. The method as claimed in claim 1, wherein:
a first parameter set of the converter system includes first maximum threshold limit temperatures of the components of the converter system, a first average desired switching frequency value or a first desired power output value in the normal operating mode,
a second parameter set of the converter system includes second maximum threshold limit temperatures of the components of the converter system, a second average desired switching frequency value or a second desired power output value in the overload operating mode,
when the first parameter set includes the first maximum threshold limit temperatures and the second parameter set includes the second maximum threshold limit temperatures, the second maximum threshold limit temperatures in the overload operating mode are greater than the first maximum threshold limit temperatures in the normal operating mode,
when the first parameter set includes the first average desired switching frequency value and the second parameter set includes the second average desired switching frequency value, the second average desired switching frequency value in the overload operating mode is less than the first average desired switching frequency value in the normal operating mode, and
when the first parameter set includes the first desired power output value and the second parameter set includes the second desired power output value, the first desired power output value is greater than or equal to the second desired power output value.

11. The method as claimed in claim 1, comprising:
tracking a time in which the converter system is operated in the overload operating mode; and generating a thermal overload history for the converter system based on the tracked time.

12. The method as claimed in claim 1, comprising:
reducing a frequency during overload operation in the overload operating mode by at least 50% in comparison with the normal operating mode.

13. The method as claimed in claim 3, wherein the current and voltage measurement concomitantly include a frequency and an amplitude measurement of the current measurement and the voltage measurement, respectively.

14. A wind turbine for exchanging electrical power with an electrical supply grid at a grid connection point, comprising:
a tower;
a nacelle;
a converter system for generating an electrical current or an electrical voltage;
a controller for controlling the converter system and operating the converter system in a normal operating mode or in an overload operating mode; and
a measuring device for detecting an overload situation in the electrical supply grid affecting the converter system, wherein the controller is configured to cause the operation of the converter system to change from the normal operating mode to the overload operating mode if the overload situation has been detected, wherein:
the controller is configured to operate the converter system in the overload operating mode during the overload situation in the electrical supply grid such that an average switching frequency for generating an output current is reduced in comparison with the normal operating mode,
a higher load for a predetermined maximum overload period is permitted on the converter system in the overload operating mode, and
during the overload operating mode, an overtemperature is permitted for the maximum overload period in the converter system, and wherein the overtemperature is a temperature at which degradation occurs in the converter system or at which the converter system is prone to the degradation,
the average switching frequency is reduced for the predetermined maximum overload period, wherein the maximum overload period is determined based on a thermal preload of the converter system that is based on a thermal capacity of the converter system or a thermal preload of components of the converter system that is based on a thermal capacity of the components of the converter system.

15. A controller for a converter system of a wind turbine, configured to:
operate the converter system in a normal operating mode;
in response to detecting an overload situation in an electrical supply grid affecting the converter system, change operation of the converter system from the normal operating mode to an overload operating mode; and
operate the converter system in the overload operating mode during the overload situation in the electrical supply grid,
wherein:
an average switching frequency for generating an output current is reduced in the overload operating mode of the converter system in comparison with the normal operating mode, a higher load on the converter system is permitted in the overload operating mode for a maximum overload period,
during the overload operating mode, an overtemperature is permitted for the maximum overload period in the converter system, and wherein the overtemperature is a temperature at which degradation occurs in the converter system or at which the converter system is prone to the degradation, and
the average switching frequency is reduced for the maximum overload period, wherein the maximum overload period is determined based on a thermal preload of the converter system that is based on a thermal capacity of the converter system or a thermal preload of components of the converter system that is based on a thermal capacity of the components of the converter system.

16. The wind turbine as claimed in claim 14, wherein the converter system includes temperature-resistant power transistors that include a semiconductor material from the list of:
Si;
SiC;
GaN; and
SiGE.

17. The wind turbine as claimed in claim 14, wherein:
a first parameter set of the converter system includes first maximum threshold limit temperatures of the components of the converter system, a first average desired switching frequency value or a first desired power output value in the normal operating mode,
a second parameter set of the converter system includes second maximum threshold limit temperatures of the components of the converter system in the overload operating mode, a second average desired switching frequency value or a second desired power output value in the overload operating mode,
when the first parameter set includes the first maximum threshold limit temperatures and the second parameter set includes the second maximum threshold limit temperatures, the second maximum threshold limit temperatures in the overload operating mode are greater than the first maximum threshold limit temperatures in the normal operating mode, and
when the first parameter set includes the first average desired switching frequency value and the second parameter set includes the second average desired switching frequency value, the second average desired switching frequency value in the overload operating mode is less than the first average desired switching frequency value in the normal operating mode, and
when the first parameter set includes the first desired power output value and the second parameter set includes the second desired power output value, the first desired power output value is greater than or equal to the second desired power output value.

18. A wind farm having a plurality of wind turbines including at least one wind turbine as claimed in claim 14.

19. The method as claimed in claim 10, comprising:
changing operation from the first parameter set to the second parameter set when operating in the overload operating mode to operate the converter system with greater maximum limit temperatures.

20. The method as claimed in claim 11, wherein the overtemperature is integrated over time to form an overload integral value, wherein the overtemperature is a temperature value by which a temperature of a component of the converter system exceeds a limit temperature.

21. The wind turbine as claimed in claim 17, wherein the wind turbine or the controller is configured to change operation from the first parameter set to the second parameter set when changing operation of the converter system to the overload operating mode to operate the converter system with greater maximum limit temperatures.

* * * * *